H. M. ROCKWELL.
BALL LOADING DEVICE.
APPLICATION FILED MAY 1, 1920.
1,419,519.
Patented June 13, 1922.
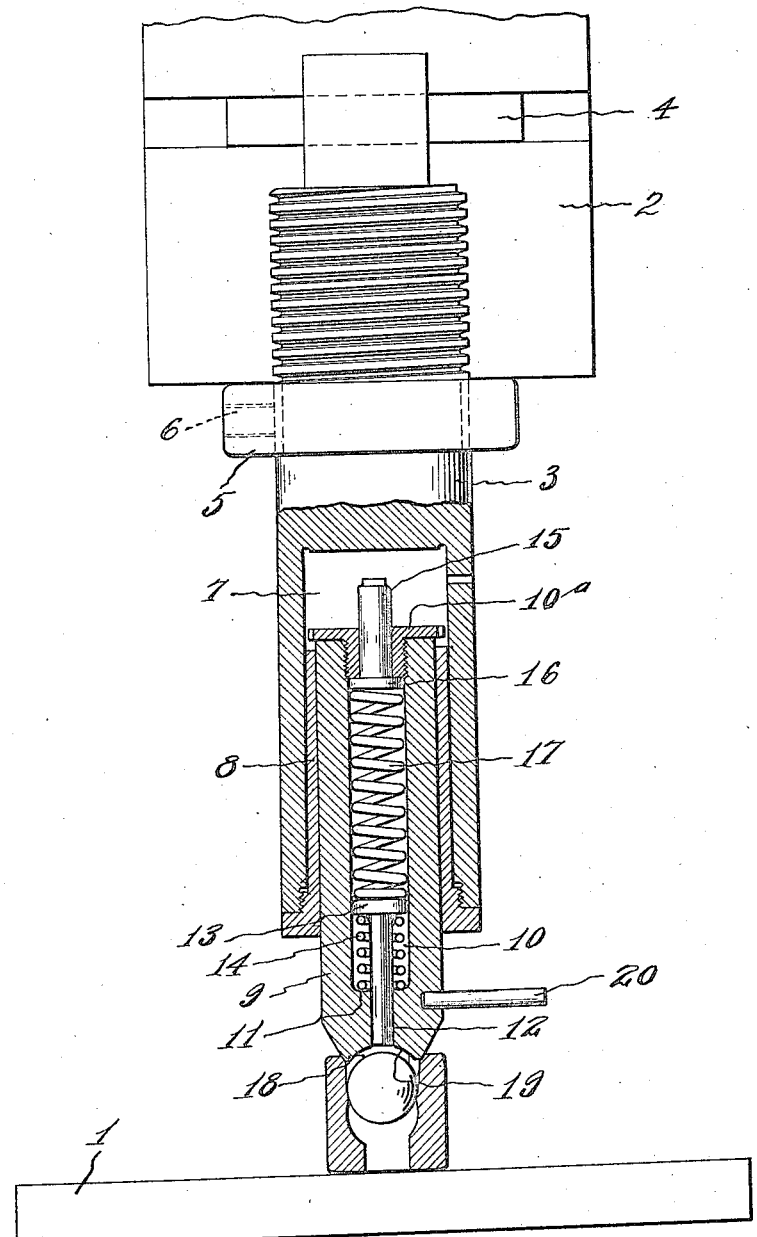
INVENTOR
HUGH M. ROCKWELL.
BY
Edward C. Sasnett.
ATTORNEY

UNITED STATES PATENT OFFICE.

HUGH M. ROCKWELL, OF BRISTOL, CONNECTICUT, ASSIGNOR, BY MESNE ASSIGNMENTS, TO STANDARD STEEL AND BEARINGS INCORPORATED, OF WILMINGTON, DELAWARE, A CORPORATION OF DELAWARE.

BALL-LOADING DEVICE.

1,419,519.    Specification of Letters Patent.    Patented June 13, 1922.

Application filed May 1, 1920. Serial No. 378,307.

*To all whom it may concern:*

Be it known that I, HUGH M. ROCKWELL, a citizen of the United States, and a resident of Bristol, in the county of Hartford and State of Connecticut, have invented certain new and useful Improvements in Ball-Loading Devices, of which the following is a specification.

This invention relates to devices for introducing balls between the grooves in the race members of antifriction bearings of the unit-handling type.

In most types of ball bearings there is provided a lateral groove in one or both of the race members extending from the face thereof to the ball raceways to provide a filling opening by means of which some of the balls are introduced between the race members. These grooves intersect the walls of the raceways in such a way as to leave the ball track uninterrupted but are of sufficient depth to allow the introduction of the balls therethrough without distortion of the balls or injury to the raceways. It is desirable that the shoulder left on the raceway be as large as possible to effectively prevent the possibility of the escape of the balls through the filling opening and also to assure a quiet bearing.

An object of this invention is the provision of a ball-loading device by means of which race members having a shallower loading groove than heretofore used may be readily loaded.

A further object of this invention is the provision of a tool for applying pressure to force balls through the filling opening of an antifriction bearing so arranged that the pressure applied to the balls cannot exceed a predetermined amount.

An additional object of the invention is the provision in a ball loading tool of means for spreading the race members and applying to the balls a predetermined pressure.

To accomplish the objects of the invention, I utilize a wedge member having resiliently mounted therein a ball-engaging plunger. The lower end or point of the wedge is shaped to enter the filling opening and contacting with the race members to apply pressure thereto to effect a slight increase in the dimensions of the opening. The wedge may be carried by the movable portion of a press of any suitable character.

In the single figure of the accompanying drawings, an embodiment of the invention is disclosed in elevation, partly in section.

1 is the bed plate of a press, preferably an air-operated arbor press, and 2 is the reciprocating member thereof having in its lower portion a threaded socket. A ram 3 having a threaded end is screwed into the socket and held against rotation by the pin 4. A stop collar 5 is provided on the ram and is held in position by the set screw 6.

The lower portion of the ram is recessed as at 7 and in said recess is provided the bushing 8. Slidably mounted in the bushing 8 is the wedge member 9 having extending therethrough the bore 10, the lower portion of which is of smaller diameter than the upper portion, thereby providing an annular shoulder 11. Slidably mounted in the reduced portion of the bore is a plunger 12 adapted to contact with a ball and force it into the raceways of a ball bearing, the enlarged head 13 of which plunger fits in the larger portion of the bore. A spring 14 is interposed between the shoulder 11 and the head 13. The upper end of the bore 10 is closed by the cap $10^a$, the periphery of which extends beyond the exterior surface of the wedge member 9 and is adapted to contact with the inner end of the bushing 8 to limit the downward movement of the wedge member. Extending through the cap $10^a$ is an aperture in which is slidably mounted the piston 15, the enlarged head 16 of which limits its upward movement. Interposed between the head 13 of the plunger 12 and the head 16 of the piston 15 is a relatively stiff spring 17, which is of sufficient strength to cause the plunger 12 to apply to a ball only so much pressure as will force it through the filling opening of a bearing without injury to itself or the raceway. The lower end of the wedge member 9 is tapered to provide a nose 18 arranged to enter the filling opening of a bearing and force apart the race members. The nose is slightly recessed at 19 to conform to a ball. A handle 20 is carried by the wedge member 9 by means of which the nose 18 may be properly positioned.

This device is used as follows: A bearing having inserted therein as many balls as can be introduced without pressure is placed on the bed plate 1. A ball is then dropped in the filling opening and the nose 18 of the wedge member brought in contact therewith. The press is then operated. The inner end of the recess in the ram engages the piston 15 and through the spring 17 and plunger 12 exerts pressure on the ball. The ball is held against movement by its engagement with the walls of the filling notch and the spring 17 is compressed until the cap 10ª is engaged by the inner end of the socket of the ram. Then the wedge member 9 is moved downward until the wedging action of the nose 18 spreads the race members sufficiently to allow the pressure exerted by the spring 17 on the plunger 12 to force the ball into the raceways. The head 2 is then lifted and the operation repeated.

It is understood, of course, that the particular device shown and described in the present application illustrates merely a preferred form of construction and an arrangement of parts, which, it has been found, will successfully carry out the principles of my invention, and that various changes and modifications of details may easily be made without departing from the spirit of my invention as defined in the appended claims.

What I claim is:

1. A device for loading balls into a bearing comprising a member adapted to exert pressure tending to spread apart the adjacent surfaces of the race members and a plunger yieldingly mounted on said member and arranged to engage a ball and force the ball into operating position between the race members.

2. A device for loading balls into a bearing comprising a wedge-shaped member and a plunger yieldingly mounted on the member intermediate the inclined faces thereof and arranged to be moved to a position projecting beyond the reduced end of the wedge-shaped member.

3. A device for loading balls into a bearing comprising means to exert pressure tending to spread apart the adjacent surfaces of the race members and means for exerting a predetermined pressure upon the ball, said pressure being exerted in a direction tending to force the ball into operating position between the race members.

4. A device for loading balls into a bearing comprising a wedge-shaped member, a plunger slidably mounted in said member, and a spring to press said plunger in one direction.

5. A device for loading balls into a bearing comprising means to engage the filling opening of a bearing and slightly increase the dimensions thereof and means to exert a predetermined pressure upon a ball to pass it through said filling opening.

6. A device of the character described comprising a member mounted for reciprocation, a wedge member slidably mounted in said first member, a plunger slidably mounted in said wedge member, a piston slidably mounted in said wedge member, and adapted to contact with said first member, and resilient means interposed between said plunger and said piston.

7. A device of the character described comprising a ram having a recess therein, a wedge member having an aperture mounted for limited reciprocation in said ram, a piston and a plunger mounted in said aperture at opposite ends thereof, and a spring interposed between said piston and plunger.

8. A device of the character described comprising a ram having a recess therein, a bushing in said recess, a wedge member mounted slidably in said bushing, said wedge member having extending therethrough a plunger mounted in the lower portion of said aperture, means to normally maintain said plunger in retracted position, a cap for the upper portion of said aperture projecting over the periphery of the wedge member, said cap having a bore therethrough, a piston mounted in said bore and adapted to engage the bottom of the recess, and a resilient member interposed between said plunger and said piston.

HUGH M. ROCKWELL.